(12) United States Patent
Yasuo et al.

(10) Patent No.: US 8,986,619 B2
(45) Date of Patent: Mar. 24, 2015

(54) EXHAUST AIR PURIFICATION DEVICE

(75) Inventors: Kinoshita Yasuo, Aichi-gun (JP);
Tadashi Takagaki, Toyota (JP);
Kazuomi Yamanishi, Tajimi (JP);
Takayoshi Doi, Toyota (JP); Tatsuo Iida, Anjo (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 285 days.

(21) Appl. No.: 13/504,828

(22) PCT Filed: Oct. 30, 2009

(86) PCT No.: PCT/JP2009/005805
§ 371 (c)(1),
(2), (4) Date: Apr. 27, 2012

(87) PCT Pub. No.: WO2011/052020
PCT Pub. Date: May 5, 2011

(65) Prior Publication Data
US 2012/0207649 A1    Aug. 16, 2012

(51) Int. Cl.
*B01D 50/00* (2006.01)
*F01N 3/20* (2006.01)

(52) U.S. Cl.
CPC .............. *F01N 3/2026* (2013.01); *Y02T 10/26* (2013.01)
USPC .......................................... 422/174; 422/177

(58) Field of Classification Search
CPC ............................. F01N 3/2026; Y02T 10/26
USPC .......................................... 422/174, 177, 180
See application file for complete search history.

(56) References Cited

U.S. PATENT DOCUMENTS

| 5,569,455 A * | 10/1996 | Fukui et al. .................... 422/174 |
| 2008/0223427 A1 * | 9/2008 | Ohno ............................. 136/238 |

FOREIGN PATENT DOCUMENTS

| JP | 05115795 A | * | 5/1993 |
| JP | 11-253814 A | | 9/1999 |
| JP | 11339932 A | * | 12/1999 |
| JP | 3334897 B2 | | 8/2002 |
| JP | 2009-189921 A | | 8/2009 |

OTHER PUBLICATIONS

International Search Report mailed Dec. 1, 2009 of PCT/JP2009/005805.

* cited by examiner

*Primary Examiner* — Tom Duong
(74) *Attorney, Agent, or Firm* — Kenyon & Kenyon LLP

(57) ABSTRACT

Disclosed is an exhaust air purification device, which enables heating a carrier uniformly and heating a catalyst supported on the carrier above an active temperature thereof even when an engine is run on a cold-start mode. Specifically disclosed is an exhaust air purification device, which includes a hollow case as an exterior, a cylindrical carrier housed in the case and having a catalyst supported thereon, and a pair of electrodes arranged on the outer circumferential surface of the carrier. In the device, the carrier is electrically heated through the pair of electrodes so that the catalyst is heated to an active temperature thereof. In the device, each of the pair of electrodes is placed on an arc-shaped outer circumferential segment of the carrier that has a central angle of 20 to 40 degrees, and the electrodes are opposed to each other with the phase difference of 180 degrees.

1 Claim, 7 Drawing Sheets

EXHAUST AIR PURIFICATION DEVICE

This is a 371 national phase application of PCT/JP2009/005805 filed 30 Oct. 2009, the contents of which are incorporated herein by reference.

TECHNICAL FIELD

The present invention relates to an exhaust air purification device, especially to the exhaust air purification device for purifying an exhaust gas from an engine.

BACKGROUND ART

Conventionally, an electrically heated catalyst (EHC) is known as an exhaust air purification device that is arranged on an exhaust path of a car and the like having an engine and that purifies an exhaust gas from the engine (for example, see JP 3334897 B2).

As shown in FIG. 10, an exhaust air purification device 100 as a conventional EHC has a hollow case 110 as an exterior thereof, a cylindrical carrier 120 having honeycomb structure that is housed in the case 110 and that has a catalyst such as platinum and palladium supported thereon, electrodes 130, 140 arranged on the outer circumferential surface of the carrier 120 so as to oppose each other and connected electrically to the carrier 120, and terminals 150, 160 connected electrically to the electrodes 130, 140, respectively and connected electrically to a power source such as a battery through wire harnesses and the like. The exhaust air purification device 100 heats the carrier 120 electrically with an electric current supplied from the power source and flowing between the electrodes 130, 140 so that the catalyst supported on the carrier 120 is heated to an active temperature thereof, and purifies toxic substances such as unburned hydrocarbon (HC), carbon monoxide (CO) and nitrogen oxide (NOx) contained in the exhaust gas from the engine by the catalytic reaction.

As mentioned above, the catalyst supported on the carrier 120 can purify the exhaust gas by the catalytic reaction in the case where a temperature thereof reaches the active temperature. However, in the case where a temperature of the catalyst does not reach the active temperature when the engine is started, especially when the engine is run in a cold-start mode, the problem occurs that the toxic substances contained in the exhaust gas are not purified and exhausted to the atmosphere.

In the exhaust air purification device 100, an electric current that flows in the carrier 120 through the electrodes 130, 140 flows through a part with low resistance in the carrier 120 preferentially. Therefore, the carrier 120 may not be uniformly heated, and there may be a part of the catalyst supported on the carrier 120 whose temperature does not reach the active temperature when the engine is run in a cold-start mode, so that the toxic substances contained in the exhaust gas are not purified enough. If the carrier 120 is heated to reach the active temperature in the whole part of the catalyst, power consumption unfortunately increases.

Moreover, in the exhaust air purification device 100, the electrodes 130, 140 are arranged on the outer circumferential surface of the carrier 120 so as to oppose each other with the phase difference of 180 degrees. Therefore, the terminals 150, 160 are arranged in the range where the electrodes 130, 140 on the outer circumferential surface of the carrier 120 are arranged. Namely, the terminals 150, 160 are arranged each other with the phase difference of approximately 180 degrees. The terminals 150, 160 are opposed to each other on the outer circumferential surface of the carrier 120, so that, for example, in the case where the exhaust air purification device 100 is installed under the floor of a car, it is necessary to secure a large space under the floor. Consequently, that is disadvantage in that an interior space of the car must be reduced.

[Patent Literature 1] JP 3334897 B2

DISCLOSURE OF INVENTION

Problem to Be Solved By the Invention

The objective of the present invention is to provide an exhaust air purification device enabled to heat a carrier uniformly and to heat a catalyst supported on the carrier above an active temperature thereof even when an engine is run on a cold-start mode.

Means for Solving the Problems

The first embodiment of the present invention is an exhaust air purification device, which includes a hollow case as an exterior, a cylindrical carrier housed in the case and having a catalyst supported thereon, and a pair of electrodes arranged on the outer circumferential surface of the carrier, in which the carrier is electrically heated through the pair of electrodes so that the catalyst is heated to an active temperature thereof, and in which each of the pair of electrodes is placed on an arc-shaped outer circumferential segment of the carrier that has a central angle of 20 to 40 degrees, and the electrodes are opposed to each other with the phase difference of 180 degrees.

In the advantageous embodiment of the exhaust air purification device, the carrier is made of SiC.

In the preferable embodiment of the exhaust air purification device, the pair of electrodes is formed in a spiral shape such as to cover the whole circumference of the carrier taken from an axial direction of the carrier from one end to the other end of the carrier in the axial direction of the carrier.

More preferably, the embodiment of the exhaust air purification device has a pair of terminals connected electrically to the pair of electrodes and projecting toward the outside of the case, in which the pair of terminals is arranged in a substantially equal phase in the circumferential direction of the carrier.

Effect of the Invention

According to the present invention, a carrier is uniformly heated, and a catalyst supported on the carrier is heated above an active temperature thereof even when an engine is run on a cold-start mode.

REFERENCE SIGNS LIST

Figure 1:
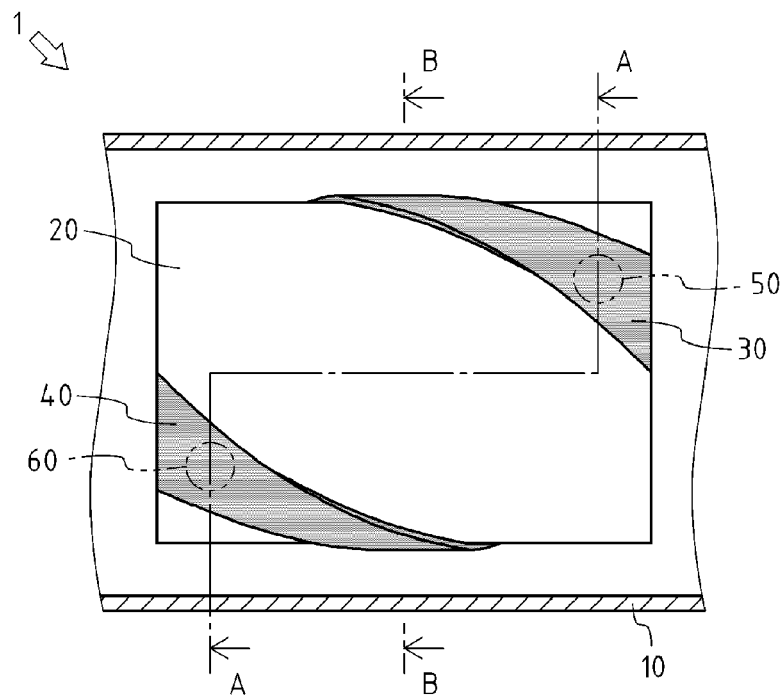
FIG. 1 is a partly sectional side view of an exhaust air purification device according to the present invention.

1: exhaust air purification device
10: case
20: carrier
30, 40: electrode
50, 60: terminal
51, 61: connecting member The Best Mode for Carrying Out the Invention With reference to FIGS. 1 to 6, an exhaust air purification device 1 is described below.

The exhaust air purification device 1 is an electrically heated catalyst (EHC) that is arranged on an exhaust path of a car and the like and that purifies an exhaust gas from an engine.

Figure 2:
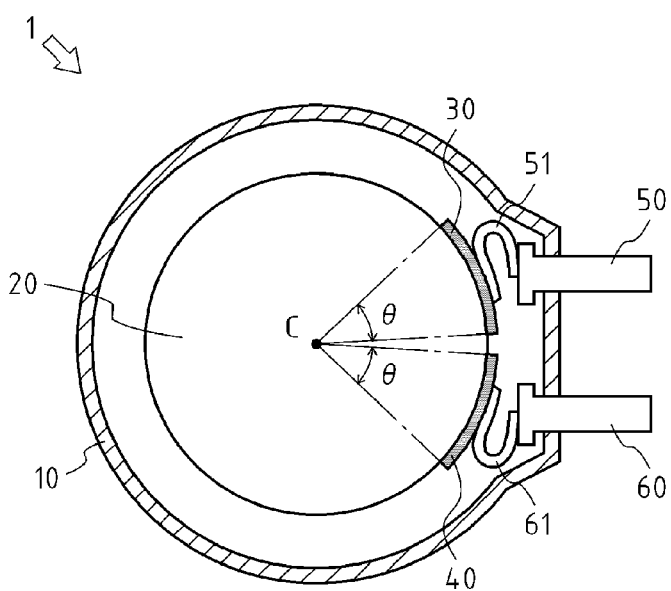
FIG. 2 is a front elevational end view of the exhaust air purification device according to the present invention (an end view taken along the line A-A in FIG. 1).

As shown in FIGS. 1 and 2, the exhaust air purification device 1 has a hollow case 10 as an exterior thereof, a carrier 20 housed in the case 10, electrodes 30, 40 arranged on the outer circumferential surface of the carrier 20, and terminals 50, 60 connected electrically to the electrodes 30, 40, respectively.

The case 10 is the exterior of the exhaust air purification device 1, is a part of an exhaust pipe in which the exhaust gas from the engine flows, and is formed in a substantially cylindrical shape.

The carrier 20 is a porous honeycomb material made of ceramics such as SiC (silicon carbide) and cordierite, and has a catalyst supported thereon such as platinum and palladium. The carrier 20 is formed in a cylindrical shape having a little smaller outside diameter thereof than the inside diameter of the case 10, and is arranged in the case 10 so that there is predetermined clearance between the carrier 20 and the inner circumferential surface of the case 10 (such the clearance that the inner circumferential surface of the case 10 and the electrodes 30, 40 arranged on the outer circumferential surface of the carrier 20 do not contact each other) and that the exhaust gas from the engine passes through the carrier 20 in an axial direction thereof. A holding member made of alumina and the like (not shown) is provided between the inner circumferential surface of the case 10 and the outer circumferential surface of the carrier 20. The holding member prevents a position of the carrier 20 from shifting, and seals the clearance between the inner circumferential surface of the case 10 and the outer circumferential surface of the carrier 20.

Besides, it is desirable that the carrier 20 is made of SiC (silicon carbide).

The electrodes 30, 40 are a pair of electrodes each of which is formed in a laminar shape on the outer circumferential surface of the carrier 20 by thermal spraying and which is made of copper, aluminum and the like. The electrodes 30, 40 are electrically connected to the carrier 20, and function as electrodes for applying an electric current to the carrier 20 and for heating that. It does not matter whether one of the electrodes 30, 40 is a positive electrode or one of the electrodes 30, 40 is a negative electrode.

As shown in FIG. 1, the electrodes 30, 40 are formed in belt shape having a predetermined width, and are arranged spirally from one end to the other end of the carrier 20 in the axial direction, opposing each other.

Figure 3:
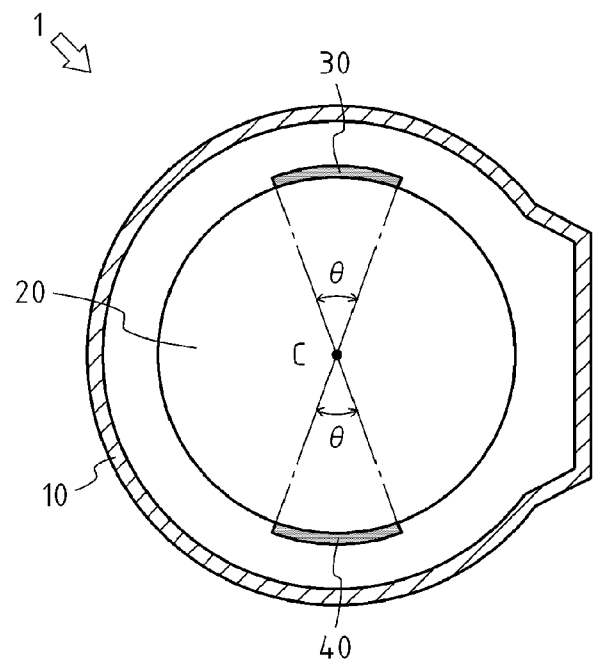
FIG. 3 is a front elevational end view of the exhaust air purification device according to the present invention (an end view taken along the line B-B in FIG. 1).
Figure 4:
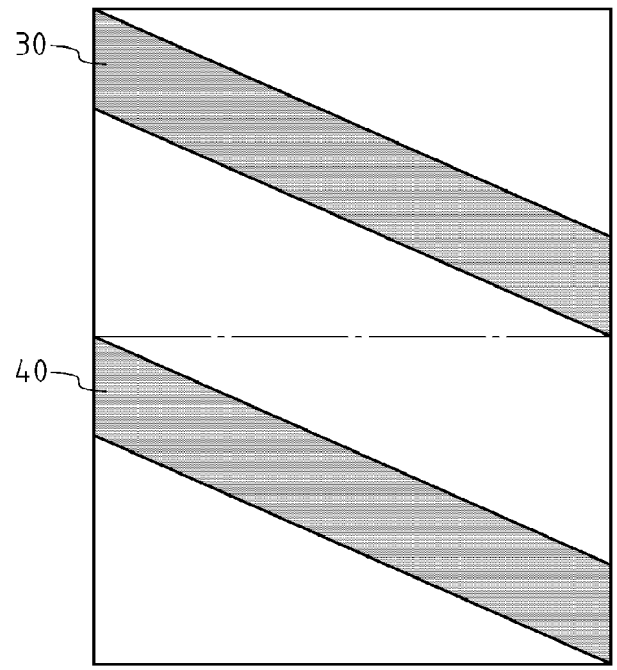
FIG. 4 is a developed view of the outer circumferential surface of a carrier.

In detail, as shown in FIGS. 3 and 4, in a section of the carrier 20 taken from the axial direction, the electrodes 30, 40 oppose each other with the phase difference of 180 degrees regardless of a position in the axial direction of the carrier 20. Additionally, the electrodes 30, 40 change their phases (rotate in a circumferential direction of the carrier 20), with their relative positions and sectional shapes maintained, from one end (left end in FIG. 1) to the other end of the carrier 20 (right end in FIG. 1), and trace the whole circumference of the carrier 20 taken from the axial direction thereof.

Hereby, a variation of temperature that occurs in a section of the carrier 20 taken from the axial direction thereof when the carrier 20 is electrically heated may be reduced by change of the phases of the electrodes 30, 40 from one end portion to the other end portion of the carrier 20 in the axial direction, and a temperature distribution of the whole carrier 20 is uniform. In other words, the carrier 20 can be heated uniformly.

The spiral shape of the electrodes 30, 40 is not restricted to those of this embodiment, but it is necessary that the electrodes 30, 40 have the spiral shape so as not to approach mutually too much and to cover the whole circumference of the carrier 20 taken from the axial direction thereof from one of the end portions to the other end portion of the carrier 20 in the axial direction.

The electrodes 30, 40 do not need to reach the both end surfaces of the carrier 20 in an axial direction thereof if the electrodes 30, 40 are arranged from a center of the carrier 20 to the neighborhood of the both end surfaces thereof in the axial direction of the carrier 20.

Moreover, it is desirable that each of the electrodes 30, 40 is placed on an arc-shaped outer circumferential segment of the carrier 20 that has a central angle of 20 to 40 degrees. In detail, as shown in FIG. 3, the electrodes 30, 40 are placed on both arcs of the carrier 20 each of whose central angles is an angle θ (hereinafter called "electrode angle θ") formed between two lines each of which extends from a center C in a section of the carrier 20 taken from the axial direction thereof toward an outside of the carrier 20 in a diametral direction thereof, and the electrode angle θ is set to 20 to 40 degrees. Namely, each of an angle formed between two lines that connect the center C and both ends of the electrode 30 in the circumferential direction of the carrier 20 and an angle formed between two lines that connect the center C and both ends of the electrode 40 in the circumferential direction of the carrier 20 is the electrode angles θ, and the electrode angle θ is set to 20 to 40 degrees.

As shown in FIGS. 1 and 2, the terminals 50, 60 are rod members for connecting the electrodes 30, 40 electrically to a power source such as a battery arranged outside of the case 10, and are arranged according to the locations of the electrodes 30, 40 with respect to the carrier 20. The terminals 50, 60 penetrate through the case 10 and the one end of each of the terminals 50, 60 projects toward outside of the case 10. The terminals 50, 60 are electrically connected to the power source through connecting cables such as wire harnesses outside the case 10, and are electrically connected to the electrodes 30, 40 through connecting members 51, 61 respectively in the inside of the case 10. Namely, one of the ends of each of the terminals 50, 60 is connected to the connecting cable, and the other end of each of the electrodes 50, 60 is connected to the connecting members 51, 61. Hereby, the terminals 50, 60 enable the power source to connect electrically to the electrodes 30, 40.

The connecting members 51, 61 are U-curved plates, and connect the electrodes 30, 40 to the terminals 50, 60 electrically. In the connecting members 51, 61, one end is connected to the other end of the terminals 50, 60, respectively, and the other end is connected to the electrodes 30, 40, respectively. The connecting members 51, 61 enable the terminals 50, 60 to be installed at a desired angle against the outer circumferential surface of the carrier 20, and function as cushions for absorbing vibration from the carrier 20.

Moreover, as shown in FIG. 2, the terminals 50, 60 are arranged in a substantially equal phase of the carrier 20. As mentioned above, the terminals 50, 60 are arranged according to the locations of the electrodes 30, 40 with respect to the carrier 20, but may project toward outside of the case 10 in the substantially equal phase of the carrier 20 by setting positions of the terminals 50, 60 against the electrodes 30, 40 to a suitable position in the axial direction of the carrier 20 because the electrodes 30, 40 are arranged spirally along the axial direction of the carrier 20.

Figure 10:
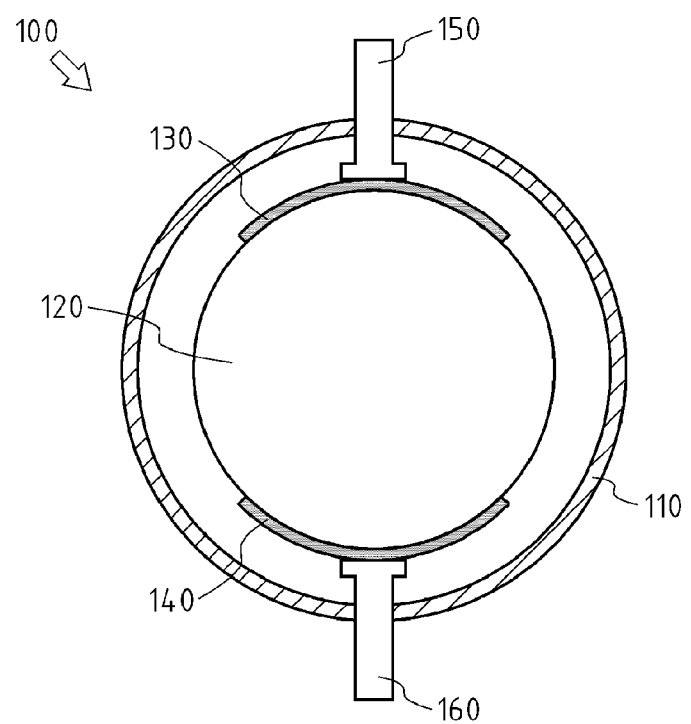
FIG. 10 is a sectional elevational view of a conventional exhaust air purification device.

Hereby, as compared with the case where both terminals oppose each other with the phase difference of 180 degrees (see FIG. 10), the exhaust air purification device 1 is downsized. For example, in a case where the exhaust air purification device 1 is installed under the floor of the car, a required space under the floor is reduced.

Here, "the substantially equal phase" of the carrier 20 means positions of the terminals 50, 60 that are suitably set so that the required space for installing the exhaust air purification device 1 can be reduced, and includes the case where the phases of the terminals 50, 60 are completely same.

As mentioned above, the exhaust air purification device 1 heats the carrier 20 electrically with an electric current supplied from the power source and flowing between the electrodes 30, 40 so that the catalyst supported on the carrier 20 is heated above an active temperature thereof, and purifies toxic substances such as unburned hydrocarbon (HC), carbon monoxide (CO) and nitrogen oxide (NOx) contained in the exhaust gas exhausted from the engine and passing through the carrier 20 by the catalytic reaction.

Figure 5:
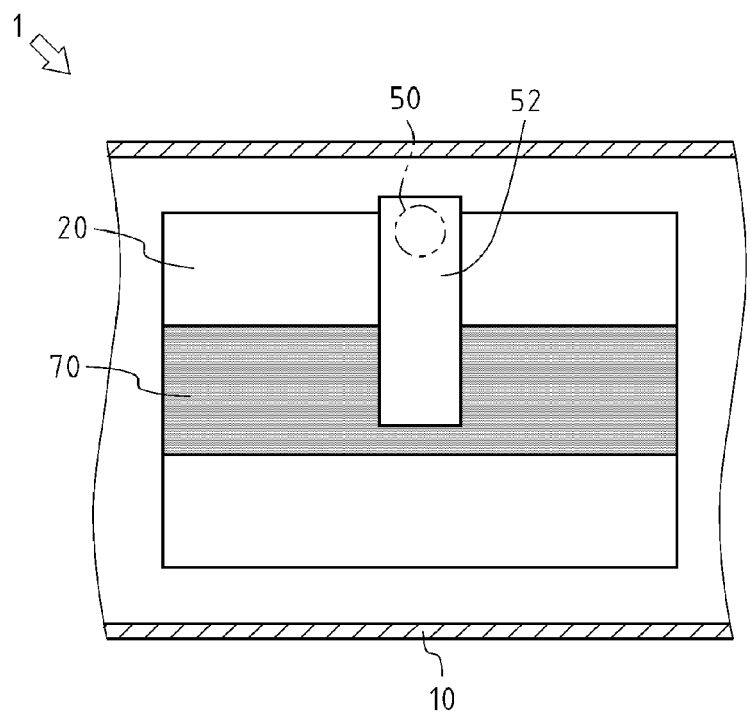
FIG. 5 is a partly sectional side view of an exhaust air purification device according to an alternative embodiment of the present invention.
Figure 6:
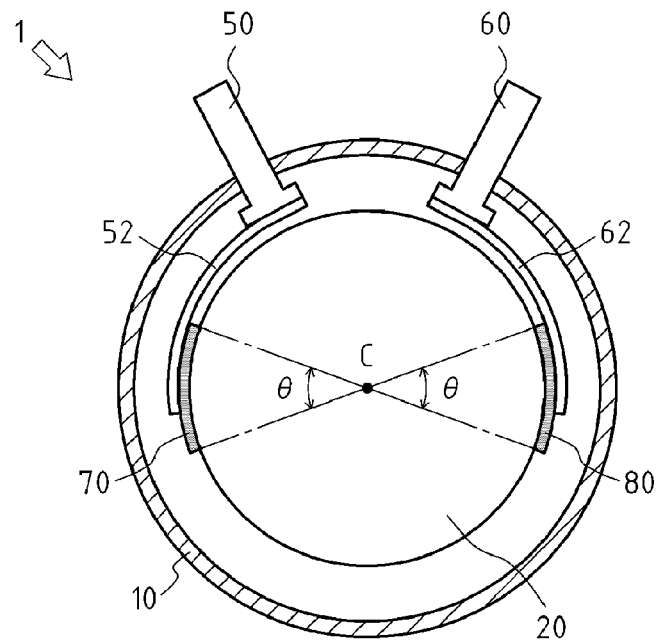
FIG. 6 is a sectional elevational view of the exhaust air purification device according to an alternative embodiment of the present invention.

As shown in FIGS. 5 and 6, it is also possible to provide straight line-shaped electrodes 70, 80 as other embodiment of electrodes arranged on the outer circumferential surface of the carrier 20 from one of the ends of the carrier 20 to the other end in the axial direction thereof.

The electrodes 70, 80 are a pair of electrodes each of which is formed in a laminar shape on the outer circumferential surface of the carrier 20 by thermal spraying and which is made of copper, aluminum and the like as well as the electrodes 30, 40. The electrodes 70, 80 are electrically connected to the carrier 20, and function as electrodes for applying an electric current to the carrier 20 and for heating that. It does not matter whether one of the electrodes 70, 80 is a positive electrode or one of the electrodes 70, 80 is a negative electrode, and a flowing direction of the electric current is not restricted.

Each of the electrodes 70, 80 is provided in the shape of a straight line from one of the end portions of the carrier 20 to the other end portion thereof in the axial direction thereof, and is placed on an arc-shaped outer circumferential segment of the carrier 20 whose central angles is the electrode angle θ so that the electrodes 70, 80 oppose each other with the phase difference of 180 degrees.

It is desirable that the electrode angle θ is set to 20 to 40 degrees.

In the case where the electrodes 70, 80 are provided instead of the electrodes 30, 40, connecting members 52, 62 are provided instead of the connecting members 51, 61 in the exhaust air purification device 1 according to the present embodiment.

The connecting members 52, 62 are plates that extend along the outer circumferential surface of the carrier 20 from a position where the electrodes 70, 80 are arranged to the substantially equal phase of the carrier 20, and connect the electrodes 70, 80 and the terminals 50, 60 electrically. One end portion of each of the connecting members 52, 62 is connected to each of the electrodes 70, 80 by thermal spraying, and the other end portion of each of the connecting members 52, 62 is connected to the other end portion of each of the terminals 50, 60 in the substantially equal phase of the carrier 20. Therefore, the terminals 50, 60 may project toward the outside of the case 10 in the substantially equal phase of the carrier 20.

Hereby, as compared with the case where both terminals oppose each other with the phase difference of 180 degrees (see FIG. 10), the size of the exhaust air purification device 1 may be small. For example, in a case where the exhaust air purification device 1 is installed under the floor of the car, a space under the floor may be reduced.

Besides, it is also possible to make the position of the terminals 50, 60 the same by curving the connecting members 52, 62 along the axial direction of the carrier 20 or something and by separating the other end portion of the connecting member 52 (a portion of the connecting member 52 which is connected to the terminal 50) from the other end portion of the connecting member 62 (a portion of the connecting member 62 which is connected to the terminal 60) in the axial direction of the carrier 20.

Figure 7:
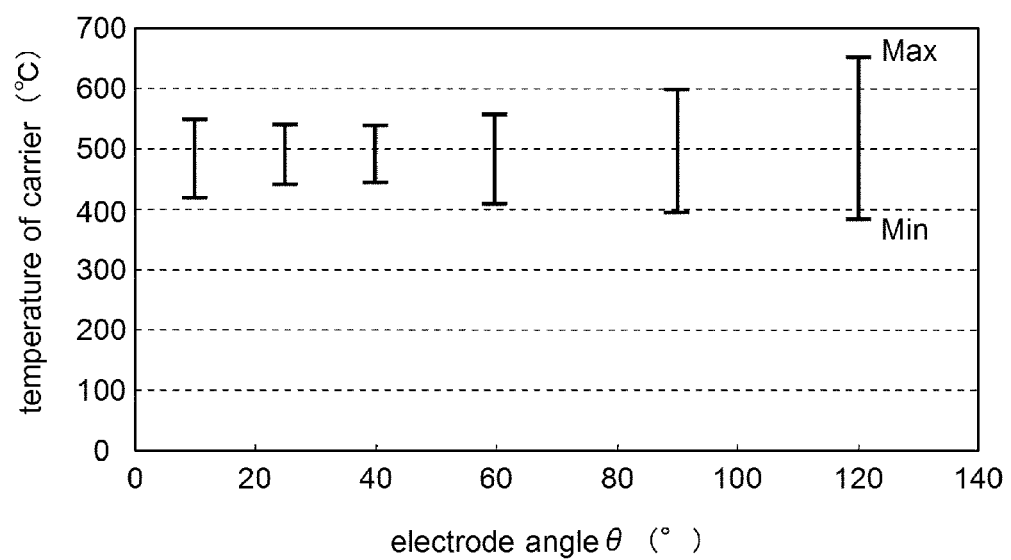
FIG. 7 shows a relation between an electrode angle and temperature of the carrier.
Figure 8:
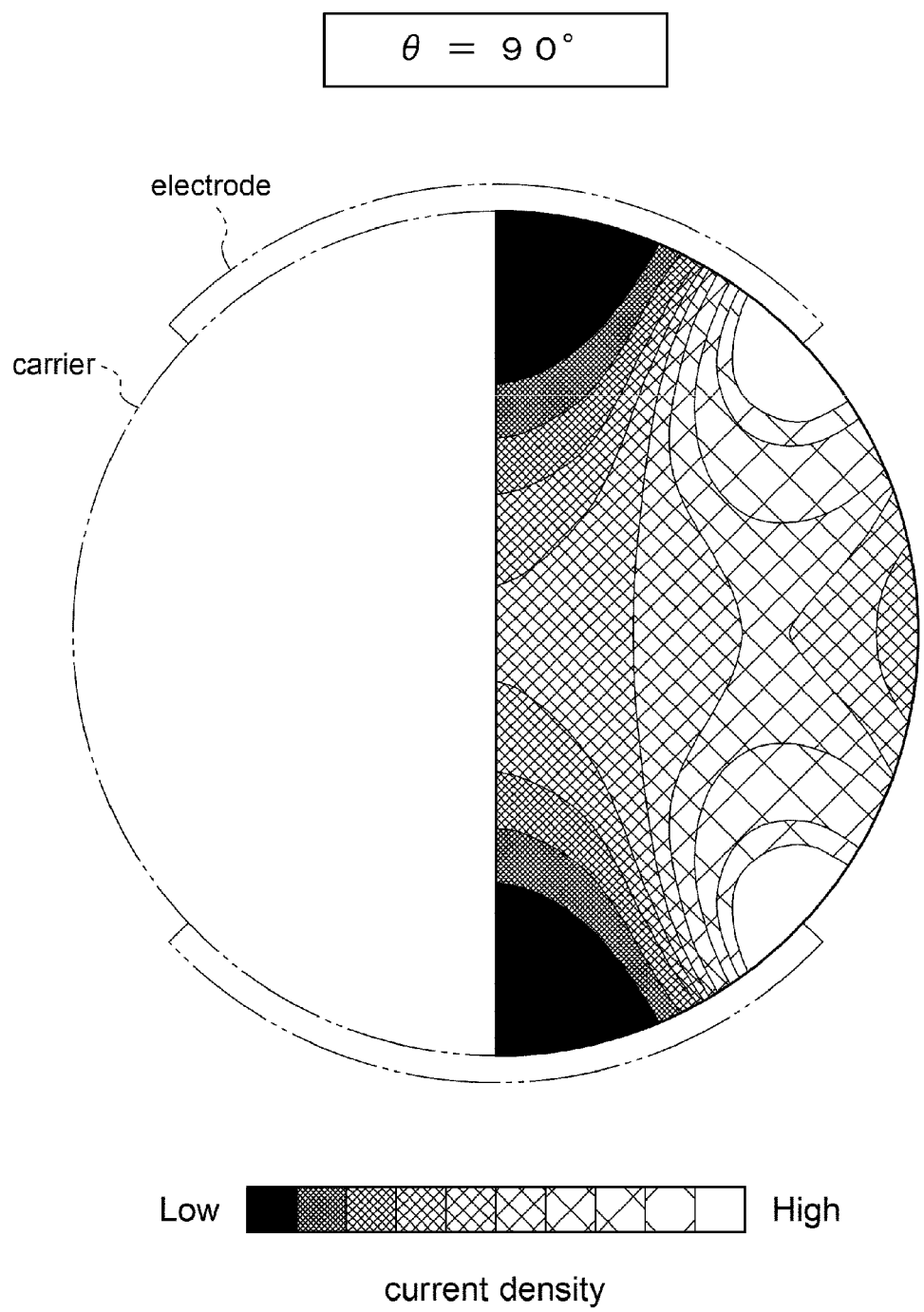
FIG. 8 shows a distribution of current density in a section of the carrier taken from an axial direction thereof.
Figure 9:
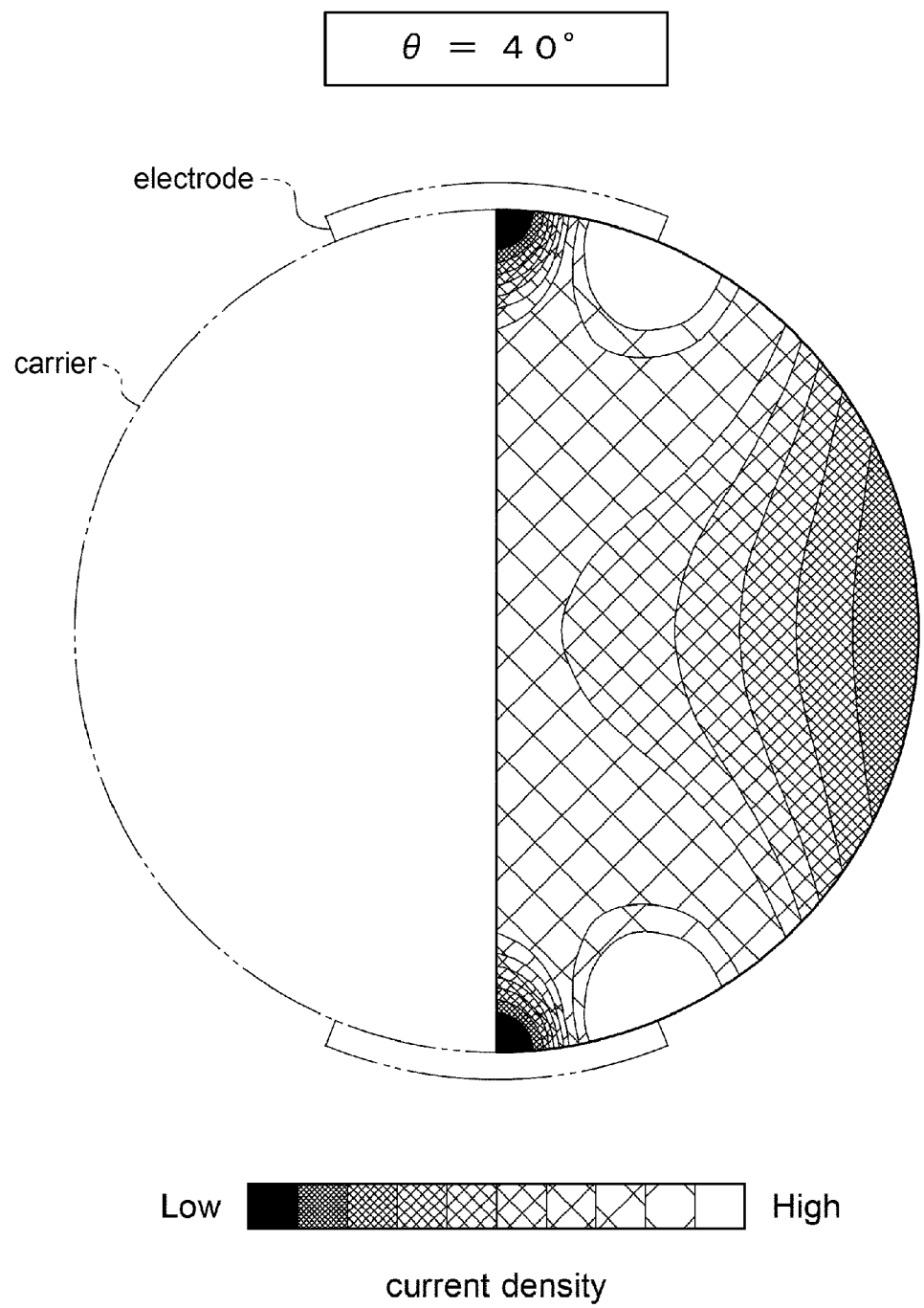
FIG. 9 shows a distribution of current density in a section of the carrier taken from an axial direction thereof.

With reference to FIGS. 7 to 9, a relation between the electrode angle θ and temperature of a carrier is described below.

FIG. 7 shows an analysis result of the relation between the electrode angle θ and the temperature of the carrier which is obtained by CAE, and temperature in a section of the carrier taken from an axial direction of the carrier according to the electrode angle θ is plotted in FIG. 7.

FIG. 8 shows a distribution of current density in the section of the carrier taken from the axial direction of the carrier which is obtained by CAE when the electrode angle θ is 90 degrees. In FIG. 8, a portion with the highest current density and a portion with the lowest current density in the section of the carrier taken from the axial direction of the carrier are represented in white and black respectively, and a variation of the current density is represented depending on intervals between lines in cross-hatching. In FIG. 8, only a half of the section of the carrier taken from the axial direction of the carrier (a right half of the section in FIG. 8) is shown.

FIG. 9 shows a distribution of current density in the section of the carrier taken from the axial direction of the carrier which is obtained by CAE when the electrode angle θ is 40 degrees. In FIG. 9, a portion with the highest current density and a portion with the lowest current density in the section of the carrier taken from the axial direction of the carrier are represented in white and black respectively, and a variation of the current density is represented depending on intervals between lines in cross-hatching. In FIG. 9, only a half of the section of the carrier taken from the axial direction of the carrier (a right half of the section in FIG. 9) is shown.

In the present experimentation, the carrier made of SiC is used.

As shown in FIG. 7, it became clear that a variation of temperature of the carrier enlarged and reduced with change of the electrode angle θ. In detail, if the electrode angle θ was larger than 40 degrees, the variation of temperature of the carrier enlarged with increase in the electrode angle θ, and if the electrode angle θ was smaller than 20 degrees, the variation of temperature of the carrier enlarged with decrease in the electrode angle θ.

For example, as shown in FIG. 8, in the case where the electrode angle θ was 90 degrees, current per unit area of the carrier (i.e. current density) was high in the vicinities of end portions of electrodes in a circumferential direction of the carrier. On the other hand, current per unit area of the carrier (i.e. current density) was low in the vicinities of the centers of the electrodes in the circumferential direction of the carrier. This was because the electric current flowed preferentially through the electrodes having higher conductivity than that of the carrier.

For example, as shown in FIG. 9, in the case where the electrode angle θ was 40 degrees, current per unit area of the carrier (i.e. current density) was high in the vicinities of end portions of the electrodes in the circumferential direction of the carrier as in the case where the electrode angle θ was 90 degrees. On the other hand, current per unit area of the carrier (i.e. current density) was low in the vicinities of the centers of the electrodes in the circumferential direction of the carrier, but the area with low current density (the area where intervals between lines in cross-hatching are comparatively narrow in FIGS. 8 and 9) reduced as compared with the case where the electrode angle θ was 90 degrees. This was because a distance between both ends of each electrode in the circumferential direction of the carrier was short and the electric current flowed through the carrier more efficiently. However, in the case where the electrode angle θ was smaller than 20 degrees, the area with low current density distributed the right side of the carrier in FIG. 9 (the area where intervals between lines in cross-hatching are comparatively narrow in FIGS. 8 and 9) enlarged.

As mentioned above, in the case where the electrode angle θ was 40 degrees, the area with low current density (the area where intervals between lines in cross-hatching are comparatively narrow in FIGS. 8 and 9) reduced and the area with high current density (the area where intervals between lines in cross-hatching are comparatively wide in FIGS. 8 and 9) enlarged as compared with the case where the electrode angle θ was 90 degrees. Therefore, in the case where the electrode angle θ was 40 degrees, the variation of temperature of the carrier reduced as compared with the case where the electrode angle θ was 90 degrees.

Here, if the variation of temperature of the carrier enlarges, a part of a catalyst supported on the carrier whose temperature does not reach the active temperature may occur when the engine is started, especially when the engine is run in a cold-start mode, and the toxic substances contained in the exhaust gas are not purified enough. Therefore, it is desirable that the variation of temperature of the carrier reduces.

As mentioned above, it became clear that if the electrode angle θ was 20 to 40 degrees, the variation of temperature of the carrier was reduced, the carrier was uniformly heated by a little electric power, and the catalyst supported on the carrier was heated above the active temperature even when the engine was run in a cold-start mode.

In particular, the electrodes were formed in the spiral shape as were the electrodes 30, 40, so that the electrodes changed their phases (the electrodes rotated in the circumferential direction of the carrier) and traced the whole circumference of the carrier taken from the axial direction thereof from one end portion of the carrier to the other end portion thereof. Namely, a phase of a temperature distribution occurring in a section of the carrier taken from the axial direction of the carrier changed (the temperature distribution rotated in the circumferential direction of the carrier) depending on positions of the electrodes from one of the end portions of the carrier to the other end portion thereof. Hereby, the variation of temperature that occurred in a section of the carrier taken from the axial direction thereof might be reduced by change of the phases of the electrodes from one of the end portions of the carrier to the other end portion thereof, and a temperature distribution of the whole carrier might become uniform. Therefore, the carrier might be heated more uniformly.

INDUSTRIAL APPLICABILITY

The present invention is applied to an exhaust air purification device for purifying an exhaust gas from an engine, especially to the exhaust air purification device having a carrier and electrodes formed on the outer circumferential surface of the carrier by thermal spraying.

The invention claimed is:

1. An exhaust air purification device comprising:
a hollow case as an exterior;
a cylindrical carrier housed in the case and having a catalyst supported thereon; and
a pair of electrodes arranged on the outer circumferential surface of the carrier, each of which is formed in a laminar shape; and
a pair of terminals connected electrically to the respective electrodes and projecting toward the outside of the case,
wherein the carrier is electrically heated through the pair of electrodes so that the catalyst is heated to an active temperature thereof, and
wherein the pair of electrodes is formed from one end portion to the other end portion of the carrier in the axial direction of the carrier, and is formed in a spiral shape such as covers the whole circumference of the carrier seen in the axial direction of the carrier
wherein the carrier is made of SiC,
wherein the pair of terminals is arranged in a substantially equal phase in a circumferential direction of the carrier,
wherein the carrier has two arc-shaped outer circumferential segments in any section thereof perpendicular to the axial direction,
wherein the segments are opposed to each other with the phase difference of 180 degrees each having a central angle of 20 to 40 degrees, and
wherein the pair of electrodes is formed on the respective segments so as to cover throughout the segments.

* * * * *